United States Patent
Andreev et al.

(10) Patent No.: US 7,231,383 B2
(45) Date of Patent: Jun. 12, 2007

(54) SEARCH ENGINE FOR LARGE-WIDTH DATA

(75) Inventors: Alexander E. Andreev, San Jose, CA (US); Anatoli A. Bolotov, Cupertino, CA (US); Ranko Scepanovic, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 474 days.

(21) Appl. No.: 10/137,874

(22) Filed: May 1, 2002

(65) Prior Publication Data
US 2003/0208475 A1 Nov. 6, 2003

(51) Int. Cl.
G06F 17/30 (2006.01)
G06F 15/16 (2006.01)
(52) U.S. Cl. ............... 707/3; 707/1; 707/4; 709/202
(58) Field of Classification Search ............... 707/1, 707/3, 5, 7, 10, 104.1; 711/154, 170; 709/202, 709/221; 705/1, 10
See application file for complete search history.

(56) References Cited

U.S. PATENT DOCUMENTS

| | | | |
|---|---|---|---|
| 6,473,846 B1 * | 10/2002 | Melchior | 711/170 |
| 2003/0037209 A1 * | 2/2003 | Stefan et al. | 711/154 |
| 2003/0123459 A1 * | 7/2003 | Liao | 370/401 |

\* cited by examiner

Primary Examiner—Jeffrey Gaffin
Assistant Examiner—Hassan "Tony" Mahmoudi
(74) Attorney, Agent, or Firm—Westman, Champlin & Kelly

(57) ABSTRACT

A search engine architecture substitutes short indices for large data widths, thereby reducing widths required for input to and output from the search engine. The search engine system comprises a search engine responsive to an input address to access an index in the search engine. The index has a width no greater than logarithm on base 2 of the search engine capacity, thereby permitting the search engine to be embodied in an IC chip of reduced area. A driver responds to input commands and to the search engine status to manage indices in the search engine and enable the memory to access its addressable locations based on indices in the search engine.

20 Claims, 3 Drawing Sheets

SEARCH ENGINE FOR LARGE-WIDTH DATA

CROSS-REFERENCE TO RELATED APPLICATIONS

This application is related to application Ser. No. 09/679,313 filed Oct. 4, 2000 for "Flexible Search Engine Having Sorted Binary Tree for Perfect Match" by Alexander Andreev and Ranko Scepanovic, now U.S. Pat. No. 6,553,370 granted Apr. 22, 2003, to application Ser. No. 09/679,209 filed Oct. 4, 2000 for "Fast Flexible Search Engine for Longest Prefix Match" by Alexander Andreev and Ranko Scepanovic, now U.S. Pat. No. 6,564,211 granted May 13, 2003, to application Ser. No. 10/000,243 filed Oct. 18, 2001 for "Fast Free Memory Address Controller" by Alexander Andreev, Anatoli Bolotov and Ranko Scepanovic, now U.S. Pat. No. 6,662,287 granted Dec. 9, 2003, and to application Ser. No. 10/078,773 filed Feb. 19, 2002 for "Two-Stage Search Engine" by Alexander Andreev, Anatoli Bolotov and Ranko Scepanovic, now abandoned, all of which are assigned to the same assignee as the present invention, the disclosures of all of which are incorporated herein by reference.

FIELD OF THE INVENTION

This invention relates to search engines, and particularly to search engines that are capable of handling wide data.

BACKGROUND OF THE INVENTION

Application Ser. Nos. 09/679,313 and 09/679,209 describe fast search engine implementations for searching large databases. Both search engines include binary search trees having a plurality of levels, with each level having one or more vertices. The vertices of the hierarchical levels of the tree aid in the search up and down the tree, while the vertices of the bottom level of the tree are leaves containing addresses and associated data. The search engine described in application Ser. No. 09/679,313 operates by perfectly matching an input query to an index or address in the search engine. The search engine described in application Ser. No. 09/679,209 operates by identifying the longest index matching the input query.

It is important to the search engine that the length of the input address (in bits) and the width of the input data (in bits) do not excessively exceed the logarithm (on base 2) of the total engine capacity. To handle long addresses and wide data, it has been necessary that search engines implemented on integrated circuit (IC) chips were larger in size (area) than would be necessary for IC search engines handling smaller input address lengths or smaller input data widths with the same capacity.

Application Ser. No. 10/078,773 describes a search engine that handles long input addresses without essentially increasing IC chip area by forming a pair of shorter search addresses based on the long input address and conducting up to two searches based on the two shorter search addresses. The search engine employs an index controller as described in application Ser. No. 10/000,243, which is a free memory manager for a search engine that structures the search tree with labels in each hierarchical vertex to identify whether or not a path from the vertex leads to a bottom level vertex containing at least one Free representation. Prior free memory managers had managed addresses on the basis of either (1) a characteristic array of allocated addresses that are either Free or Taken, indicating the status of the addresses, or (2) a list of only the Free addresses.

SUMMARY OF THE INVENTION

The present invention is directed to a search engine that handles wide input data without increasing IC chip area by substituting short indices in the search tree for wide data that are stored in an external memory.

The search engine architecture manages data with wide widths without increased chip area. The search engine substitutes short indices for wide input data, and manages the input data based on the short indices. More particularly, data are stored in an external memory and associated to a short index in the search engine. Data are searched using the search engine to locate the associated short index, and are retrieved from the external memory and output using the located index as a memory address.

In preferred embodiments, a search engine system is embodied in one or more integrated circuit chips for performing search and edit operations on a database having data stored in an external memory at addressable locations. The search engine system comprises a search engine responsive to an input address to access an index in the search engine. The index has a width no greater than the logarithm (base 2) of engine_capacity, where engine_capacity is the capacity of the search engine. A driver is responsive to an input command and to a status of the search engine to manage indices in the search engine and to enable the memory to access its addressable locations based on indices in the search engine.

Searches are performed by locating an index at a search engine location accessible by the input address and using the index to access a memory location in the memory to thereby output data. Insert edits are performed by allocating an index by a driver and an associated index controller and storing the allocated index at the search engine location addressed by the input address. The data are stored in the memory at the memory location addressed by the allocated index. Delete edits are performed by de-allocating the index at the search engine location addressed by the input address.

In some embodiments, the search engine also employs the two-stage address technique described in application Ser. No. 10/078,773 wherein long addresses are split into two or more address portions. A first address portion includes a first segment of the long address and is used during a first address stage to return an address index. The address index and a second address segment form the second address portion which is used to return the index for addressing the memory.

DETAILED DESCRIPTION OF THE PREFERRED EMBODIMENTS

The present invention is directed to search engines that can handle wide input data. In its simplest form, wide input data are encoded to a shorter index for use in the search engine, while the wide data are stored in an external memory. On retrieval, the shorter stored index is decoded into wider output data. An index controller compacts wide data by substituting indices, in the form of binary vectors, for wide input data. The indices have widths no greater than the logarithmic length of the engine capacity. Thus, a search engine having a capacity of 4K (4096 bits) handles data having a width of 104 bits by substituting an index having a width of 12 bits for use in the search engine in place of the data. The index controller operates to allocate indices for inserted data, and de-allocate indices for deleted data.

On input of data, an index having a width no greater than the logarithm of the engine capacity (e.g., 12 bits for an engine having a capacity of 4096 bits) is substituted by the search engine for the wide data. On output of data, the search engine performs an inverse substitution, outputting the longer width data for the index. For example, for data with a width of 104 bits, the search engine substitutes a 12-bit index for the data on input, and substitutes the 104-bit data for the 12-bit index on output. An external memory stores the wide data and performs the substitution with the index controller. If the search engine does not use data, no inverse substitution is required and the external memory is not used.

The search engine operates in a manner that is transparent to external modules. Consequently, external modules operating with the search engine direct data and addresses to the search engine in the same manner as they direct data and addresses to the search engines described in the aforementioned application Ser. Nos. 09/679,313 and 09/679,209. Because each index is no larger than the logarithm of the engine capacity, the search engine according to the present invention employs an IC chip that is smaller in area than IC chips of comparable prior search engines. Moreover, delays and engine timing characteristics are improved. Thus, by incorporating the index controller and external memory in the search engine in accordance with the present invention, the search engine can handle input data of arbitrary width without increasing chip size or timing of the base search engine. For an engine with a 4K capacity and receiving 104-bit wide input data, the index controller is about 1% of the total engine size and the engine size is about 10–12% less than that of prior search engines required to handle 104-bit wide data.

Figure 1:
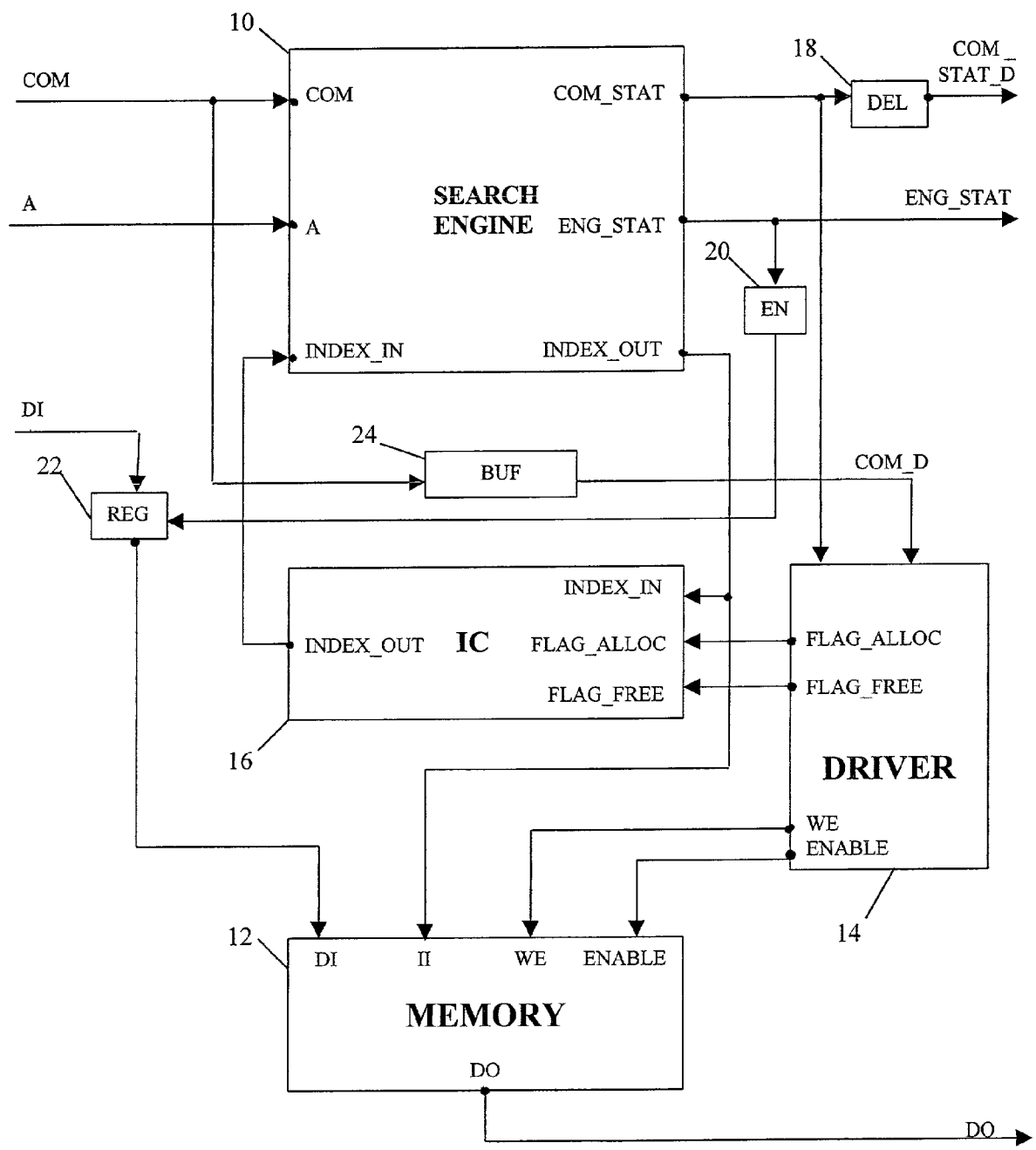
FIG. 1 is a functional block diagram of a search engine in accordance with the presently preferred embodiment of the present invention.

FIG. 1 is a functional block diagram of a search engine according to a presently preferred embodiment of the present invention. The principal portions of the search engine comprise a basic search engine 10, external memory 12 and index controller 16. Control signals for memory 12 and controller 16 are provided by driver 14, and delays and other ancillary functions are performed by delay 18, enable register 20, register 22 and latency buffer 24.

I. Basic Search Engine 10.

Figure 2:
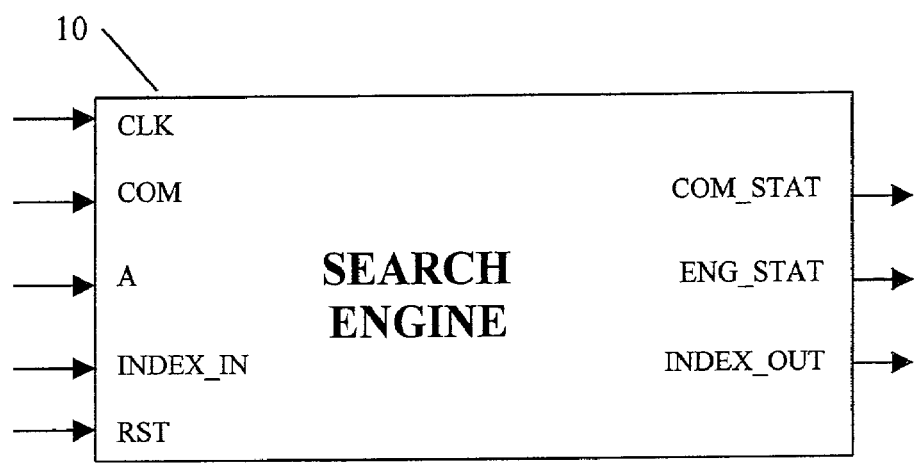
FIG. 2 is a diagram illustrating a search engine used in the apparatus shown in FIG. 1, together with its inputs and outputs.

FIG. 2 illustrates the layout of a chip forming the basic search engine 10, which may be implemented as described in the aforementioned application Ser. Nos. 09/679,313 and 09/679,209. Search engine 10 is a functional module for searching and editing (inserting or deleting) entries. Search engine 10 may be in the form of a binary tree and is searched through hierarchical vertices as described in application Ser. Nos. 09/679,313 and 09/679,209. Since the methodology of a search is not affected by the present invention, other than in the management of the search engine as herein described, reference should be made to application Ser. Nos. 09/679,313 and 09/679,209 for a complete description of the search techniques.

Each entry E in search engine 10 is in the form (addr, ind), where addr is an address in address space and ind represents an index to data associated with it. As will be more evident hereinafter, the data (represented by dat) are stored in external memory 12. Only one index entry is addressed by a given address. Address addr and index ind are binary vectors having dimensions a_width and ind_width, respectively. The capacity of the engine is defined by parameter engine_capacity, and ind_width is equal to the number of bits in the binary representation of the engine capacity and is the smallest integer that is greater than or equal to the logarithm (base 2) of engine_capacity, ind_width=log[2] (engine_capacity). For instance, for an engine capacity equal to 1024, ind_width equals 10 bits.

Engine 10 functions in discrete units of time or clock cycles t=0,1,2,3 . . . As shown in FIG. 2, engine 10 has 2-bit input COM, an a_width-bit input A for input addresses, an ind_width-bit input index (INDEX_IN), and clock and reset inputs CLK and RST. Engine 10 also has two 2-bit outputs COM_STAT and ENG_STAT for the status of a completed command and for the current engine status, respectively, and an ind_width-bit output index (INDEX_OUT).

The status of completed commands by engine 10 is identified by output COM_STAT codes. There are four possible status codes reflecting the status of completed commands, namely "Completed Successfully", "Not Found", "Already Exists, Updated" and "Ignored". Output INDEX_OUT is the outputted index of the completed command. Both outputs INDEX_OUT and COM_STAT are computed for a given command with a latency equal to latency_delay.

The current state of engine 10 is identified by output ENG_STAT codes. There are three possible status codes reflecting the current state of the engine, namely "Ready", "Busy" and "Ready and Full".

If the engine status at moment t is "Ready", that status will not change until new edit command (INSERT or DELETE) arrives. Upon receipt of an edit command, ENG_STAT will be changed to "Busy" at next time unit t+1.

If the engine status is "Busy" (which occurs if the engine is performing an edit), the "Busy" status remains unchanged until the engine completes the current edit function. When the last edit command is completed, engine status becomes "Ready" or "Ready and Full". The "Ready and Full" status is set if total number of entries in engine memory has reached its maximum at completion of the edit command. The time required to perform an edit command is nondeterministic and depends on the editing algorithm implemented in the engine. If an edit command arrives at engine input COM at time t while the engine status is "Busy", the command status COM_STAT "Ignored" is given at the time t+latency_delay, and output index INDEX_OUT will be set to zero.

If engine status is "Ready and Full" the engine can only operate on a DELETE command at input COM. Any INSERT command will be computed as "Ignored".

There are three input commands, SEARCH, INSERT and DELETE, with SEARCH being a default command without regard to engine status. INSERT and DELETE are editing commands, SEARCH is a search command. At each time t one of these commands is input at COM to the engine. The input address is inserted at A and input index is inserted at INDEX_IN.

The SEARCH command searches the engine memory for data written at input address addr. If an entry exists at the address addr in engine memory, E=(addr, some_ind) then at time t+latency_delay COM_STAT will be set to "Completed Successfully" and INDEX_OUT will output some_ind, INDEX_OUT=some_ind. Otherwise, COM_STAT will be set to "Not Found" and INDEX_OUT=0 at time t+latency_ delay. The search is conducted through the search tree as described in application Ser. Nos. 09/679,313 and 09/679, 209.

The DELETE command is performed only if current engine status is "Ready" or "Ready and Full". The DELETE command searches the engine memory for data written at input address addr. If an entry exists at the address addr in engine memory, at time t+latency delay COM_STAT will be set to "Completed Successfully" and INDEX_OUT will output some ind, INDEX_OUT=some_ind from address addr. Otherwise, COM_STAT will be set to "Not Found" and INDEX_OUT=0 at time t+latency_delay.

The INSERT command is performed only if current engine status is "Ready". As in the case of other engine commands, the SEARCH command searches the engine memory for an entry E at address addr. If the engine finds such an entry it will first write the updated entry E=(addr, input_ind) into its memory and then output COM_STAT "Already Exists, Updated" and INDEX_OUT=some_ind at time t+latency_delay output. If no entry is found at address addr, the engine will write into its memory new entry E=(addr, input_ind) and at time t t+latency_delay output COM_STAT code "Completed Successfully" and INDEX_OUT=INDEX_IN.

II. External Memory 12.

Figure 3:
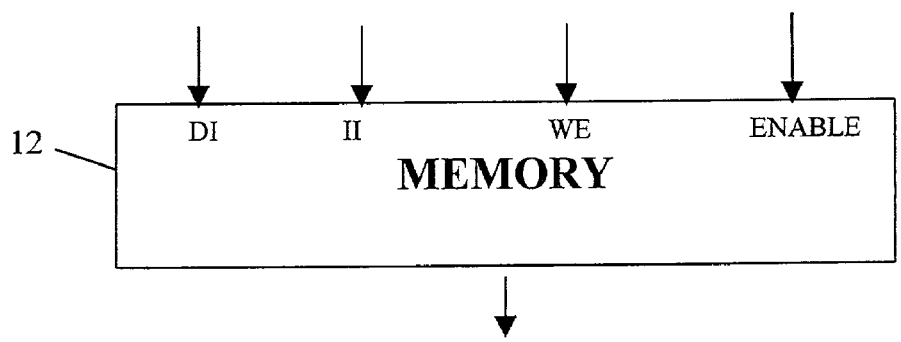
FIG. 3 is a diagram illustrating an external memory used in the apparatus shown in FIG. 1, together with its inputs and outputs.

External memory module 12 is a standard memory module, depicted in FIG. 3, represented by a memory array consisting of engine_capacity number of words each having a length equal to d_width (width of data). Each word is stored at address II, where II is a binary index output from search engine 10 at INDEX_OUT having a length ind_ width. External memory 12 functions in discrete time units, or clock cycles, t=0,1,2,3 . . . During a given time unit, the memory can be in an active (enable) or inactive (disable) state, depending on the state of the ENABLE flag. When an external memory is inactive (i.e. ENABLE=0), then DO=0 and nothing occurs. When the memory is active (i.e. ENABLE=1) the memory can perform either of two operations, READ or WRITE.

A READ operation for a given address II provides a word DO (memory data_out) from the external memory that is stored in the memory at the address II, i.e. DO=MEMORY [II]. A WRITE operation for a given address II and given word DI (memory data_in) provides a write of the word DI at address II, i.e. MEMORY[II]=DI and DO=DI. If address II contains a word, that word is erased (old nonempty content of address II is erased). The type of operation to be performed is determined by auxiliary flag WE (write enable). If WE=1 then a WRITE operation is performed; if WE=0, a READ operation is performed.

III. Index Controller 16.

Figure 4:
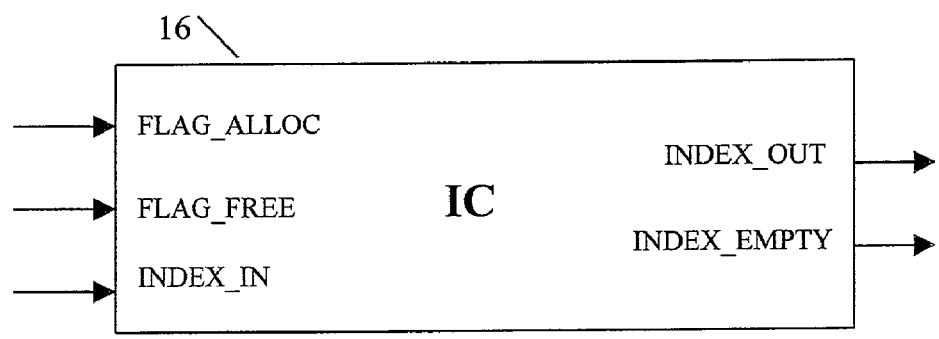
FIG. 4 is a diagram illustrating an index controller used in the apparatus shown in FIG. 1, together with its inputs and outputs.

The main purpose of index controller 16 is to substitute engine input data having a large width with indices of minimal width. Index controller 16 is illustrated in FIG. 4.

Index controller 16 functions during time units t=0,1,2, 3 . . . The controller has two 1-bit inputs FLAG_ALLOC and FLAG_FREE, an input INDEX_IN having a width ind_ width. The controller has an output INDEX_OUT also having a width ind_width, and a 1-bit output FLAG_EMPTY. The principal purpose of the controller is to maintain the processes of allocation and setting free of indices by control of the search engine which forms controller inputs (directly or via controller driver) and utilizes its outputs.

Each index i of a set of indices, I={0,1, . . . , engine_ca-pacity-1}, has a width ind_width. The number of indices equals engine_capacity. Each index i has a status S(i,t) at time t which is either Free or Taken and which is changed during operation of the controller depending of whether the index i has been allocated or set free during the current time t. Thus, S(i,t)=Free designates that at the given time t index i is free and can be allocated (can be taken) on execution of the next allocation command of controller. If S(i,t)=Taken then index i is already used by search engine (allocated) and must be set free before using it again. Thus, for any given time t, S(i,t) appears as a characteristic function of free or taken indices. The index status is 1 if the status is Taken and is 0 if the status is Free. The function of index controller 16 is described by the following rules:

1. Initially INDEX_OUT=0, FLAG_EMPTY=0 and status of the first index (index 0) is 1 (i.e. Taken) and all other indices have status equal to 0 (i.e. Free). Reset of the index controller requires a single time unit.
2. An ALLOC command at a given time t is the combination of controller input flags of FLAG_ALLOC=1 and FLAG_ FREE=0. A FREE command at a given time t is the combination of controller input flags of FLAG_AL-LOC=0 and FLAG_FREE=1. A REALLOC command at a given time t is the combination of controller input flags of FLAG_ALLOC=1 and FLAG_FREE=1.
3. If at time t the controller command is ALLOC or FREE (a REALLOC command takes only 1 time unit), then the controller operates for d time units. The value of d depends on the current characteristic function of Taken indices at time t (and, of course, on the underlying algorithm implemented in the controller). D is the maximal value of d and is the controller delay. Controller delay D is less than engine delay in performing its edit commands.
4. If controller is in the operating state (i.e. controller is performing an ALLOC or FREE command), the arrival at that time unit of a new controller command of either ALLOC or FREE or REALLOC causes an error. If the controller is in a non-operating state, the controller outputs remain unchanged until arrival of a new command. Thus, while being in non-operating state, the controller outputs last computed are available to the search engine.
5. The FREE command may be related only to an index whose status is Taken, and the ALLOC command finds only an index whose status is Free, otherwise an error occurs.
6. If the last free index was taken then controller outputs new value of FLAG_EMPTY, i.e. FLAG_EMPTY=1.
7. If FLAG_EMPTY=1, then only FREE or REALLOC commands may be applied to the controller inputs. At least one FREE command must be completed before any ALLOC command can be performed to release FLAG_EMPTY=0. An ALLOC command when FLAG_EMPTY=1 causes an error.

Figure 5:
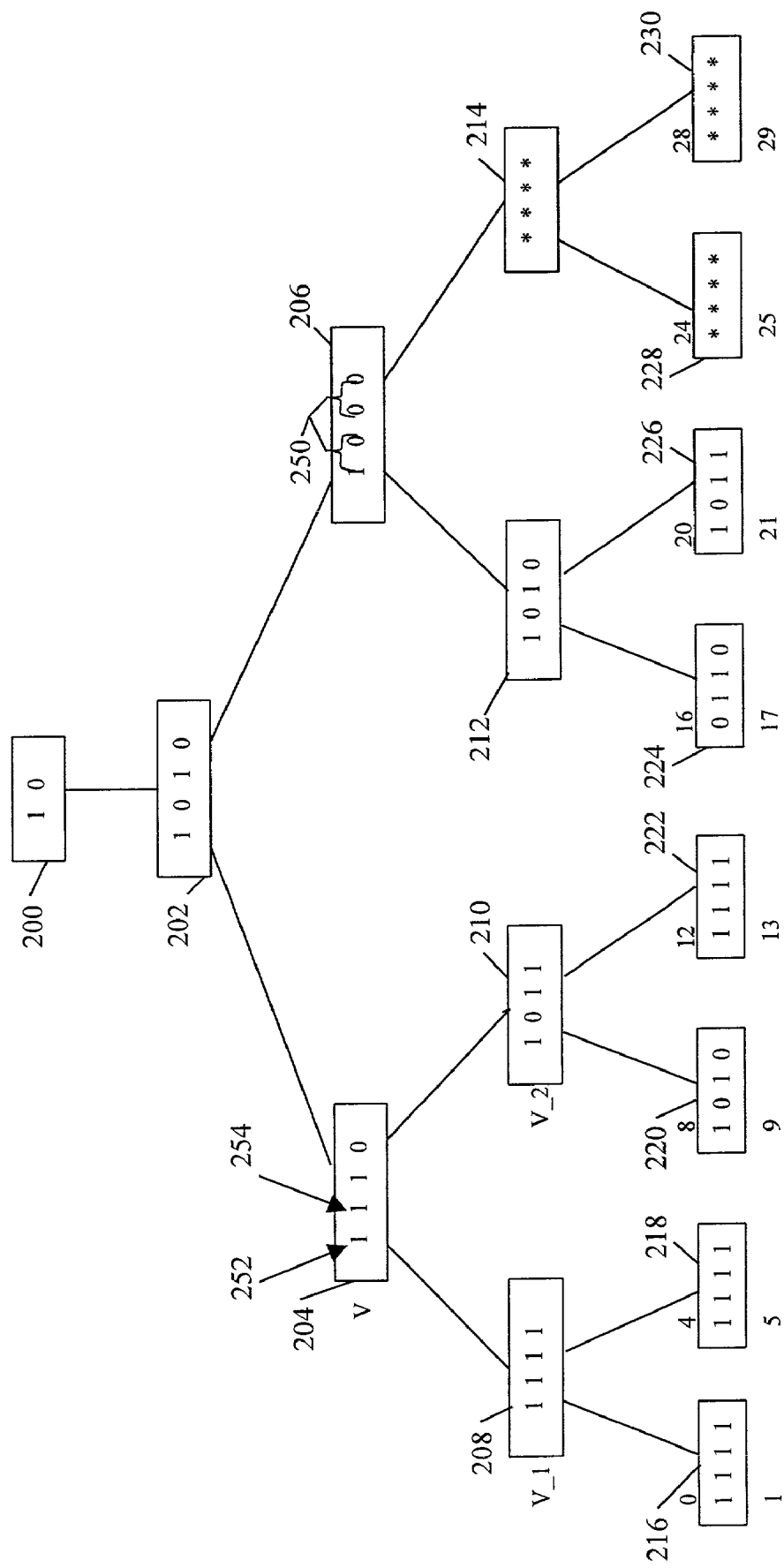
FIG. 5 is a functional diagram of a hierarchical tree employed in one form of an index controller illustrated in FIG. 4.

FIG. 5 is an example of an index controller 16 functional tree as described in application Ser. No. 10/000,243. The index controller is similar to a p-nary tree with special labels for each subtree S of the tree. The example of FIG. 5 is of a tree containing four levels and each hierarchical vertex 202–214 contains two such labels (p=2), top vertex 200 contains one label. 2p is the length of a word in memory 12. Typically, p=16, 32 or 64 bits. Thus the example of p=2 is a simple example to illustrate the principles of the index controller, and in practice p will be 16, 32 or 64, or more.

As shown in FIG. 5, an entry top word or vertex is shown at 200. A zero level contains vertex 202. A first level contains vertices 204 and 206 that are both children of vertex 202. A second level contains vertices 208 and 210 that are children of vertex 204, and vertices 212 and 214 that are children of vertex 206. A bottom level contains vertices or leaves 216 and 218 that are children of vertex 208, vertices or leaves 220 and 222 that are children of vertex 210, vertices or leaves 224 and 226 that are children of vertex 212, and vertices or leaves 228 and 230 that are children of vertex 214. Two subtree labels 250 are attached to each vertex other than a bottom vertex. Each subtree label consists of a first bit 252 (called a FLAG_EXIST flag) that designates whether or not the subtree has been visited since last reset and a second bit 254 (called a FLAG_FULL flag) that designates whether or not there are vertices in the bottom level of the subtree containing representations of Free indices. For example, the subtree label "11" appearing in vertex 204 means that the subtree whose parent is vertex 208 has been visited since the last reset and that the bottom vertices 216 and 218 represents only Taken indices. The subtree label "10" appearing in vertex 204 means that the subtree whose parent is vertex 210 has been visited since the last reset and that at least one bottom vertex 220 and/or 222 includes a representation of a Free index (in other words, not all indices represented by the subtree whose parent is vertex 210 are Taken). Therefore, the vertices 216–230 of the bottom level represent the characteristic array for Free and Taken indices. The bits of the 2-bit top word 200 has the same meaning for entire tree. (For reasons described in application Ser. No. 10/000,243, index 0 is managed differently and on the fly.)

Each internal vertex v of the tree can be viewed as a word having a length of 2p bits consisting of (in a natural order from left to right) p 2-bit labels representing the status of p subtrees at p child vertices v_1, v_2, ..., v_p. The vertices 216–230 located at the bottom level of the tree also appear as p 2-bit words but when concatenated these words appear as a 2p-bit word whose bits are representative of the characteristic function (Taken=1, Free=0) of all of the indices (except index 0) of the associated memory 12 or 14. For a more complete description of the tree illustrated in FIG. 5, reference may be made to the aforementioned application Ser. No. 10/000,243.

The controller commands can be described as follows:

ALLOC Command.

Starting from the Top vertex 200, a search is made of the FLAG_FULL flags in each vertex, commencing with the left-most vertex of each level and moving to the right-most vertex and thence to the next lower level. The first vertex containing a 0-valued FLAG_FULL flag is located, and subtrees are followed from the designated vertex to the bottom level to find a Free status associated with an index. The search traces down the tree to the first bottom vertex 216, setting the word in the first vertex of each level to (1,0,0, ..., 0). This sets the first representation to "Taken" and indicates that the first bottom vertex 216 has been visited since the last reset. The representation of the index in the bottom vertex 216 is changed to "1", indicating the index is Taken. If all other indices in the bottom vertex are Taken, the corresponding FLAG_FULL status in the parent vertex 208 is also changed to "1". If the all FLAG_FULL flags in a parent vertex 208 become "1", the corresponding FLAG_FULL flag in parent vertex 204 is changed to "1". In this manner, the flags denote a path to Free indices in bottom vertices.

When a free index is located and Taken, it is output and appears continuously at the output until a new command appears. If the FLAG_EXIST bit is set in all of the hierarchical vertices and the index is the last free index, (i.e., the FLAG_FULL flags in top level 200 is set), the controller sets FLAG_EMPTY=1.

Thus, an ALLOC command arriving at time t causes the index controller to go into its operating state and find some free index i and in less than D time units. The status of index i is changed to Taken, and index i is output at time t+D, i.e. INDEX_OUT=i at time t+D. Index i is output continuously until a new command arrives. If index i is the last free Index from the set of all indices, then the controller outputs FLAG_EMPTY=1 at time t+1.

FREE Command.

The FREE command is executed commencing at the bottom level of the tree in the vertex or leaf containing the Taken status (1-bit) that corresponds to the index i to be set free. Since the index i is known, the number of the vertex and its bit position in the vertex can be easily calculated. The value of that bit is changed to 0. If necessary, the values of the FLAG_FULL bits in the parent vertices may be edited from 1 to 0 as described in the case of ALLOC command.

Thus, a FREE command arriving at time t causes the controller to go into its operating state and change the status of index INDEX_IN to Free by time t+D. INDEX_OUT remains unchanged until a new command arrives. If FLAG_EMPTY=1 then it will be released at the moment t+1.

REALLOC Command.

Input index i=INDEX_IN can be reallocated at once and will be output at time t+1, i.e. INDEX_OUT=i at time t+1. Index i is output continuously until a new command arrives. The state of FLAG_EMPTY does not change.

IV. Driver 14

Driver 14 manages the process of data and index substitution and reverse substitution by controlling index controller 16 and external memory 12. Driver 14 provides the FLAG_ALLOC and FLAG_FREE flags to index controller 16 and provides the WE write enable flag and the ENABLE flag to external memory 12. Driver 14 receives a COM_D signal from latency buffer 24 and the COM_STAT signal from search engine 10. The COM_D is identical to the COM command signal to search engine 10, except that it is delayed (BUF) through latency buffer 24, which matches the latency of search engine 10. Consequently, the COM_D command corresponds to the COM_STAT output from search engine 10.

In the event that the COM_STAT code is "Completed Successfully", if the COM_D command is the engine command INSERT, the allocation flag is set to 1 and the free flag is set to 0 (FLAG_ALLOC=1 and FLAG_FREE=0). If the COM_D code is engine command DELETE, the FLAG_ALLOC is set to 0 and FLAG_FREE is set to 1 (FLAG_ALLOC=0 and FLAG_FREE=1). In all other cases where the COM_STAT code is "Completed Successfully", both flags are set to 0 (FLAG_ALLOC=0, FLAG_FREE=0).

If the COM_STAT code is "Already Exists, Updated", both the FLAG_ALLOC and FLAG_FREE flags are set to 1 if COM_D engine command is INSERT (FLAG ALLOC=1 and FLAG FREE=1). In all other cases where the COM_STAT code is "Already Exists, Updated", both flags are set to 0 (FLAG_ALLOC=0 and FLAG FREE=0).

If COM STAT is either "Not Found" or "Ignored", both flags are set to 0 (FLAG_ALLOC=0 and FLAG_FREE=0), regardless of the engine command code.

In a similar manner, WE and ENABLE outputs of driver 14 are computed from the COM_STAT and COM_D codes. More particularly, if the COM_D code is an INSERT engine command and the COM_STAT code is either "Completed Successfully" or "Already Exists, Updated", the write enable flag is set to 1 (WE=1). In all other cases (i.e., the engine command COM_D is either SEARCH or DELETE or COM_STAT is "Not Found" or Ignored", the write enable flag is set to 0 (WE=0).

If COM_STAT is "Completed Successfully" and the engine command COM_D is a valid command (i.e., SEARCH, INSERT or DELETE), or if COM_STAT is "Already Exists, Updated" and the engine command COM_D is INSERT, the enable flag is set to 1 (EN-ABLE=1). In all other cases, the enable flag is set to 0 (ENABLE=0) (that is, if the COM_D is not a valid command, or if COM_STAT is either "Not Found" or "Ignored", or if COM_STAT is "Already Exists, Updated and COM_D is something other than INSERT, ENABLE=0).

Delay 18 provides a single time cycle delay for the COM_STAT code to synchronize to the output DO from memory 12. Enable device 20 computes an enable signal for register 22 based on the state of the ENG_STAT code from search engine 10. More particularly, if ENG_STAT is either "Ready" or "Ready and Full", enable device 20 provides an enable signal ("1") to register 22. Otherwise, (for example, if ENG_STAT is "Busy", enable 20 provides a 0 to register 22).

Register 22 is responsive to input data DI and to the state of the enable signal from enable device 20, to store input data in memory 12. Thus, register 12 allows the storing of input data when the enable signal "1" is supplied by enable device 20. As previously described, buffer 24 delays input command COM by a time delay equal to the latency (BUF) of search engine 10 to supply COM_D commands to driver 14 synchronous with COM_STAT signals from search engine 10.

V. Latency.

When search engine 10 executes engine commands, a search is performed in search engine 10. The command status COM_STAT_D is output from search engine 10 and output data DO are output from external memory 12. The search result is obtained in a time unit of a latency_delay, which is a latency delay associated with search engine 10. Another time unit (cycle) may be required to read output data DO from external memory 12. Consequently, the computed output values of COM_STAT_D and DO can be obtained in a time unit equal to latency_delay+1 time units. The status ENG_STAT of the search engine is computed as described above in Section III, based on the command being performed.

VI. Commands.

As described above, edit commands (INSERT and DELETE) can be accomplished only if the search engine is ready for editing, i.e. its ENG_STAT is "Ready" (ready for INSERT or DELETE) or "Ready and Full" (ready for DELETE). In all other cases, outputs for editing commands can be computed immediately.

SEARCH Command.

The search commences with a SEARCH command input at COM to search engine 10. Input address some_addr is input at A to the engine and a search is conducted. If the COM_STAT output is "Completed Successfully", search engine 10 returns an INDEX_OUT=some_ind, which is the index stored at address some_addr in the search engine (entry E=(some_addr,some_ind). The some_ind index is supplied to the II (index in) input to memory 12. The "Completed Successfully" COM_STAT output also operates driver 14 to supply an ENABLE flag to memory 12 so that memory 12 accesses some_dat at address some_ind. Consequently, memory 12 returns DO=some_dat from address some_ind in external memory 12. If the COM_STAT output of the search conducted by search engine 10 is "Not Found" no address some_addr was found, and search engine 10 returns an output INDEX OUT=0 and driver 14 returns an output ENABLE=0, causing memory 12 to output DO=0. The computation of COM_STAT_D and the output of DO occurs at a time that takes into account the latency delay (latency_delay+1 time units) for the search engine.

INSERT Command.

An INSERT command can only be executed when the search engine 10 is ready (i.e., when ENG_STAT=Ready). In this case, an input comprises (some_addr, some_dat), where some_addr is the address A to the search engine and some_dat is the input data DI. The some_dat input data are stored in register 22 due to the enable signal from enable device 20 being enabled by the "Ready" state of ENG_STAT.

Input address some_addr is input at A to the engine together with a some_free_ind from index controller 16. Two cases can arise: (1) search engine 10 might not find address some_addr in its memory, or (2) search engine 10 might find address some_addr previously inserted to the engine memory as an entry E=(some_addr,some_taken_ind).

In the first case, the search engine will store a new entry E=(some_addr,some_free_ind) in its memory and will take and return some_free_ind to the II (index input) to memory 12 and set the COM_STAT output to "Completed Successfully". Memory 12 is then enabled by the WE (write enable) flag from driver 14 to store original input data some_dat held in register 22 at address some_free_ind in memory 12 as memory entry E=(some_free_ind,some_dat) and return DO=some_dat as output. (The taking of some_free_ind by the search engine memory changes the status of the index from Free to Taken, so that the index is a some_taken_ind in subsequent operations.)

Consequently, the FLAG_ALLOC flag is set due to the delayed INSERT command at COM_D and its command status COM_STAT (which is "Completed Successfully" in this case), causing index controller 16 to allocate new free index some_new_free_ind from its memory, to output it and to hold it at its output INDEX_OUT until it will be taken by next arriving INSERT command.

In the second case the search engine stores new entry E=(some_addr,some_free_ind) in its memory and first return its input some_free_ind to the II (index in) input to memory 12 and set the COM_STAT output to "Already Exists, Updated". As in the first case, memory 12 is then enabled by the WE (write enable) flag from driver 14 to store original input data some_dat held in register 22 at address some_free_ind in memory 12 as memory entry E=(some_free_ind, some_dat). Engine 10 then returns some_taken_ind it found in its memory to the II (index in) input to memory 12. Memory 12 is then enabled by the ENABLE=1 and WE=0 flags from driver 14 to read the previously inserted data some_old_dat stored at address some_taken_ind in memory 12 as memory entry E=(some_taken_ind, some_old_dat) and return DO=some_old_dat as output.

Consequently, the FLAG_ALLOC flag and the FLAG_FREE flag are set due to the delayed INSERT command at COM_D and its command status COM_STAT (which is "Already Exists, Updated" in this case), causing index controller 16 to perform a REALLOC command, namely to output (or redirect) index some_taken_ind to the INDEX_OUT of controller output and to hold it for further use by next arriving INSERT command.

DELETE Command.

The DELETE command can be executed when the search engine 10 is in a "Ready" or "Ready and Full" state. In this case, input entry is to be deleted from the search engine memory and stored data (if found) is to be deleted from memory 12.

Input address some_addr is input at A to the engine, together with some_free_mind supplied from index controller 16). Two cases can arise: (1) search engine 10 might not find the address some_addr in its memory, or (2) search engine 10 might find in the address some_addr previously inserted to engine memory as an entry E=(some_addr, some_taken_ind).

In the first case, search engine 10 returns a "Not Found" COM_STAT indicating that the address was not found and the memory returns an output DO=0 as previously described for the SEARCH command.

In the second case, search engine 10 returns a "Completed Successfully" COM_STAT, entry E=(some_addr,some_taken_ind) is deleted from the engine memory, and some_taken_ind is output to memory 12 and index controller 16. The delayed COM_D command DELETE and the COM_STAT "Completed Successfully" to driver 14 operates the driver to set the FLAG_FREE flag. Index controller 16 responds to the FLAG_FREE flag to de-allocate some_taken_ind (i.e., changes the status of some_taken_ind to Free). The output of index controller 16 remains unchanged until the next INSERT command arrives and the engine status will be "Ready".

VII. Summary.

The invention is preferably embodied in an integrated circuit (IC) chip of a computer to carry out the two-stage search process herein described. The chip may be a memory chip, in which case driver 14, controller 16 and search engine 10 may reside on the same IC chip as the memory 12. Alternatively, the hardware may reside on one or more IC chips separate from memory 12, in which case the memory may be a different memory chip, hard drive(s), or an external memory(s).

The invention may also be embodied as computer readable program code that is stored as a computer useable program on a computer readable medium that causes a computer to manage a memory as herein described. For example, the search engine, index controller and driver may be included on a transportable computer readable medium, such as a floppy disk or the like or on a hard drive medium to manage the hard drive memory, or an external memory associated with the computer.

The width of indices, ind_width, in search engine 10 is equal to the logarithm (base 2) of the engine capacity, log [2] (engine_capacity). The search engine responds to input addresses to retrieve indices that address an external memory containing the corresponding data, wider than the logarithm (base 2) of engine_capacity. Consequently, the search engine is able to handle data having widths greater than the logarithm (base 2) of the engine capacity without increasing chip area. The addition of the index controller adds about 1% to the total area of the engine, but using the index controller according to the present teachings results in a reduction of search engine area of about 10 to 12% over prior search engines handling large width data. Consequently, the area of the integrated circuit chip for carrying out the present invention may be smaller than that of chips necessary for similar search engines not employing index substitution.

In one embodiment, the invention may be carried out with the two-stage search engine described in application Ser. No. 10/078,773. More particularly, application Ser. No. 10/078,773 describes a technique for handling long addresses by splitting each long address into two or more portions and conducting searches using the address portions. In one form, a long address is split into left and right address portions L_addr and R_addr, each with a length no greater than the logarithm (base 2) of engine_capacity. The left address portion is in the form of 0,l_addr and the right address portion is in the form of 1,a_ind,r_addr, where the input address is the concatenation of l_addr,r_addr and a_ind is an address index associated with l_addr. The "0" and "1" bits identify whether the address portion is a left or right portion. Search and edit commands are performed in one or two stages. For example, a first search is conducted (first stage) in the search engine using the left address portion 0,l_addr to return the address index a_ind. A second search is conducted (second stage) in the search engine using the right address portion 1,a_ind,r_addr to return a data index d_ind, which is used to search the memory for data. The teachings of the present invention may be applied to the two-stage search engine so that the width of data index d_ind equals the logarithm (base 2) of engine_capacity. Thus, the search engine would be able to handle both long addresses and wide data without increasing IC chip area.

Although the present invention has been described with reference to preferred embodiments, workers skilled in the art will recognize that changes may be made in form and detail without departing from the spirit and scope of the invention.

What is claimed is:

1. A search engine system embodied in one or more integrated circuit chips for performing search and edit operations on an external memory, the search engine system comprising:
    a search engine comprising a search tree, wherein the search engine is responsive to an input address to access an index stored at a search tree location in the search tree and to output the index, the index having a width no greater than a predetermined size; and
    a driver responsive to an input command and to a status of the search engine to manage indices in the search tree and to supply a control signal to the memory to access addressable memory locations in the memory that are based on the index output by the search engine.

2. The system of claim 1, wherein the search engine has a capacity to store a plurality of indices with one index at each search tree location and the width of each index is the number of bits in a binary representation of the engine capacity, and wherein the width of each index is no greater than the logarithm (base 2) of engine_capacity, where engine_capacity is the capacity of the search engine.

3. The system of claim 1, wherein the input command is a search command, and the driver is responsive to the search command and to a status indicative that the search engine has successfully found an index at the input address to operate the memory to access a memory location based on the found index and to output data stored at the accessed memory location.

4. The system of claim 1, wherein the input command is an insert command and an input entry includes input data, and wherein
the search engine is responsive to the address to store an index at a search tree location based on the search address,
the driver is responsive to the insert command and to the successful storage of an index at the search tree location to operate the memory to store the input data at a memory location based on the index.

5. The system of claim 4, further comprising a register responsive to the successful storage of an index to store the input data, the memory being responsive to the successful storage of an index to store input data in the register at the memory location based on the index.

6. The system of claim 1, wherein the input command is a delete command, and the driver is responsive to the delete command and to a status indicative that the search engine has successfully found an index at a search tree location based on the input address to de-allocate the found index.

7. The system of claim 1, wherein the search engine is responsive to an input address to derive first and second address portions, with the second address portion including a section based on the first address portion, the index being accessed by the second address portion.

8. The system of claim 1, further comprising a register for storing the input data, the memory being responsive to an accessed index to store input data from the register at a memory location based on the index.

9. The system of claim 8, wherein the input command is a search command or an insert command or a delete command, and
a) the driver is responsive to the search command and to a status indicative that the search engine has found an index at the accessed search tree location to provide an enable signal, and
the memory is responsive to the enable signal and the index to access a memory location based on the index and output data stored at the accessed memory location,
b) the driver is responsive to the insert command to allocate an index at the accessed search tree location and is responsive to the insert command and the allocated index to provide an write enable signal, and the memory is responsive to the write enable signal and the allocated index to store input data at a memory location based on the allocated index, and
c) the driver is responsive to the delete command and to a status indicative that the search engine has found an index at the accessed search tree location to de-allocate the found index.

10. A process of operating on a search tree to perform search and edit operations on data stored at addressable memory locations in an external memory, wherein input entries applicable to the search tree include input addresses for accessing addressable search tree locations, the process comprising, for each input entry, steps of:
a) accessing a search tree location based on an input address;
b) receiving a search command; and
c) executing the search command on the search tree, wherein executing comprises identifying an index at the accessed search tree location and outputting the identified index, and wherein the index represents a memory location in the memory.

11. The process of claim 10, wherein executing the search command further comprises steps of:
c1 accessing the memory location based on the index, and
c2) outputting data from the accessed memory location.

12. The process of claim 11, wherein the search tree has a capacity to store a plurality of indices with one index at each search tree location and the width of each index is the number of bits in a binary representation of the search tree capacity, and wherein the width of each index is no greater than logarithm (base 2) of engine_capacity, where engine_capacity is the capacity of the search tree.

13. The process of claim 10, and further comprising receiving an insert command and executing the insert command on the search engine and the memory, wherein executing the insert command comprises steps of:
allocating an index representative of a memory location,
storing the index at the accessed search tree location, and
storing input data in the memory at the memory location based on the index.

14. The process of claim 13, wherein the search tree has a capacity to store a plurality of indices with one index at each search tree location and the width of each index is the number of bits in a binary representation of the search tree capacity, and wherein the width of each index is no greater than logarithm (base 2) of engine_capacity, where engine_capacity is the capacity of the search tree.

15. The process of claim 10, and further comprising receiving a delete command and executing the delete command on the search engine, wherein executing the delete command comprises steps of:
de-allocating an index in the search tree location based on the input address, wherein the de-allocated index is representative of a memory location containing data to be deleted.

16. The process of claim 15, wherein the search tree has a capacity to store a plurality of indices with one index at each search tree location and the width of each index is the number of bits in a binary representation of the search tree capacity, and wherein the width of each index is no greater than logarithm (base 2) of engine_capacity, where engine_capacity is the capacity of the search tree.

17. The process of claim 10, wherein the search tree has a capacity to store a plurality of indices with one index at each search tree location and the width of each index is the number of bits in a binary representation of the search tree capacity, and wherein the width of each index is no greater than logarithm (base 2) of engine_capacity, where engine_capacity is the capacity of the search tree.

18. The process of claim 10, further comprising steps of:
d) separating the input address into first and second address segments,
e) generating a first address portion based on the first address segment,
f) retrieving an address index from a location addressed by the first address portion, and
g) deriving a second address portion based on the retrieved address index and the second address segment,
wherein step a) is performed using the second address portion.

19. The process of claim 18, wherein the search tree has a capacity to store a plurality of indices with one index at each search tree location and the width of each index is the number of bits in a binary representation of the search tree capacity, and wherein the width of each index is no greater than logarithm (base 2) of engine_capacity, where engine_capacity is the capacity of the search tree.

20. A process of operating on a search tree to perform search and edit operations on data stored at addressable memory locations in an external memory, wherein input entries applicable to the search tree include input addresses for accessing addressable search tree locations, the process comprising, for each input entry, steps of:

a) accessing a search tree location based on an input address;

b) receiving a command selected from the group comprising search, insert and delete commands; and c) executing the command on at least one index in the search tree representing a memory location in the memory based on the command and the contents of the accessed search tree location, wherein c1) if the command is a search command,
identifying an index at the accessed search tree location,
accessing a memory location based on the index, and output data from the accessed memory location, c2) if the command is an insert command,
allocating an index representative of a memory location,
storing the index at the accessed search tree location, and
storing input data in the memory at the memory location based on the index, and c3) if the command is a delete command,
de-allocating an index in the search tree location based on the input address, wherein the de-allocated index is representative of a memory location containing data to be deleted.

* * * * *